US012786896B2

(12) United States Patent
(10) Patent No.: US 12,786,896 B2
(45) Date of Patent: Nov. 3, 2026

Yuan et al.

(54) REPORT OF MULTIPLE POWER-MANAGEMENT MAXIMUM POWER REDUCTION VALUES

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 351 days.

(21) Appl. No.: 18/579,971

(22) PCT Filed: Sep. 29, 2021

(86) PCT No.: PCT/CN2021/121566

§ 371 (c)(1),
(2) Date: Jan. 17, 2024

(87) PCT Pub. No.: WO2023/050116

PCT Pub. Date: Apr. 6, 2023

(65) Prior Publication Data

US 2024/0334350 A1 Oct. 3, 2024

(51) Int. Cl.
*H04W 52/36* (2009.01)

(52) U.S. Cl.
CPC ....... *H04W 52/367* (2013.01); *H04W 52/365* (2013.01)

(58) Field of Classification Search
CPC .......................... H04W 52/367; H04W 52/365
USPC .......................................................... 370/329
See application file for complete search history.

(56) References Cited

U.S. PATENT DOCUMENTS

| | | | | |
|---|---|---|---|---|
| 2014/0036827 | A1 | 2/2014 | Han et al. | |
| 2021/0297959 | A1* | 9/2021 | Zhou | H04B 1/3838 |
| 2021/0329570 | A1* | 10/2021 | Wang | H04W 52/54 |
| 2023/0111064 | A1* | 4/2023 | Rahman | H04B 7/0628 370/252 |
| 2023/0292259 | A1* | 9/2023 | Matsumura | H04W 52/18 |
| 2024/0172140 | A1* | 5/2024 | Yang | H04W 52/36 |

FOREIGN PATENT DOCUMENTS

| | | |
|---|---|---|
| CN | 112867129 A | 5/2021 |

OTHER PUBLICATIONS

International Search Report and Written Opinion—PCT/CN2021/121566—ISA/EPO—Apr. 26, 2022.

(Continued)

*Primary Examiner* — Asad M Nawaz
*Assistant Examiner* — Michael Wayne Maddox
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for transmitting a report that indicates multiple power-management maximum power reduction (P-MPR) values for a cell of a set of one or more cells indicated in the report. The UE may transmit the report that indicates the multiple P-MPR values for the cell. Numerous other aspects are described.

30 Claims, 11 Drawing Sheets

(56) References Cited

OTHER PUBLICATIONS

Mediatek Inc: "Enhancement on Multi-Beam Operation", 3GPP TSG RAN WG1 #105-e, e-Meeting, May 10-27, 2021, the whole document, 29 Pages.
Moderator (Samsung): "Moderator Summary#5 for Multi-Beam Enhancement: Round 4", R1-2108557, 3GPP TSG RAN WG1 #106-e, Aug. 27, 2021 (Aug. 27, 2021) Section 2.5, 22 Pages.
RAN1: "Further Enhancements on MIMO for NR", 3GPP TSG RAN Meeting #93-e, RP-211788, No. Electronic Meeting, Sep. 13, 2021-Sep. 17, 2021, 3rd Generation Partnership Project (3GPP), Mobile Competence Centre, 650, Route Des Lucioles, F-06921 Sophia-Antipolis Cedex, France, vol. TSG RAN, No. Electronic Meeting, Sep. 13, 2021-Sep. 17, 2021, 23 Pages, Sep. 7, 2021, XP052050304, p. 5, p. 9-p. 12.
VIVO: "Discussion on the Support of P-MPR Report", R2-2004650, 3GPP TSG-RAN WG2 Meeting #110 electronic, E-Meeting, Jun. 1-Jun. 12, 2020, Section 2.1, 4 Pages.

* cited by examiner

REPORT OF MULTIPLE POWER-MANAGEMENT MAXIMUM POWER REDUCTION VALUES

CROSS-REFERENCE TO RELATED APPLICATION

This application is a 371 national stage application of PCT Application No. PCT/CN2021/121566, filed on Sep. 29, 2021, and entitled "REPORT OF MULTIPLE POWER-MANAGEMENT MAXIMUM POWER REDUCTION VALUES," which is hereby expressly incorporated by reference herein.

FIELD OF THE DISCLOSURE

Aspects of the present disclosure generally relate to wireless communication and to techniques and apparatuses for a using a report of multiple power-management maximum power reduction values.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration for transmitting a report that indicates multiple power-management maximum power reduction (P-MPR) values for a cell of a set of one or more cells indicated in the report. The method may include transmitting the report that indicates the multiple P-MPR values for the cell.

Some aspects described herein relate to a method of wireless communication performed by a base station. The method may include transmitting a configuration for transmitting a report that indicates multiple P-MPR values for a cell of a set of one or more cells indicated in the report. The method may include receiving the report that indicates the multiple P-MPR values for the cell.

Some aspects described herein relate to a UE for wireless communication. The user equipment may include a memory and one or more processors coupled to the memory. The one or more processors may be configured to receive a configuration for transmitting a report that indicates multiple P-MPR values for a cell of a set of one or more cells indicated in the report. The one or more processors may be configured to transmit the report that indicates the multiple P-MPR values for the cell.

Some aspects described herein relate to a base station for wireless communication. The base station may include a memory and one or more processors coupled to the memory. The one or more processors may be configured to transmit a configuration for transmitting a report that indicates multiple P-MPR values for a cell of a set of one or more cells indicated in the report. The one or more processors may be configured to receive the report that indicates the multiple P-MPR values for the cell.

Some aspects described herein relate to a non-transitory computer-readable medium that stores a set of instructions for wireless communication by a UE. The set of instructions, when executed by one or more processors of the UE, may cause the UE to receive a configuration for transmitting a report that indicates multiple P-MPR values for a cell of a set of one or more cells indicated in the report. The set of instructions, when executed by one or more processors of the UE, may cause the UE to transmit the report that indicates the multiple P-MPR values for the cell.

Some aspects described herein relate to a non-transitory computer-readable medium that stores a set of instructions for wireless communication by a base station. The set of instructions, when executed by one or more processors of the base station, may cause the base station to transmit a configuration for transmitting a report that indicates multiple P-MPR values for a cell of a set of one or more cells indicated in the report. The set of instructions, when executed by one or more processors of the base station, may cause the base station to receive the report that indicates the multiple P-MPR values for the cell.

Some aspects described herein relate to an apparatus for wireless communication. The apparatus may include means for receiving a configuration for transmitting a report that indicates multiple P-MPR values for a cell of a set of one or more cells indicated in the report. The apparatus may include means for transmitting the report that indicates the multiple P-MPR values for the cell.

Some aspects described herein relate to an apparatus for wireless communication. The apparatus may include means for transmitting a configuration for transmitting a report that indicates multiple P-MPR values for a cell of a set of one or more cells indicated in the report. The apparatus may include means for receiving the report that indicates the multiple P-MPR values for the cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
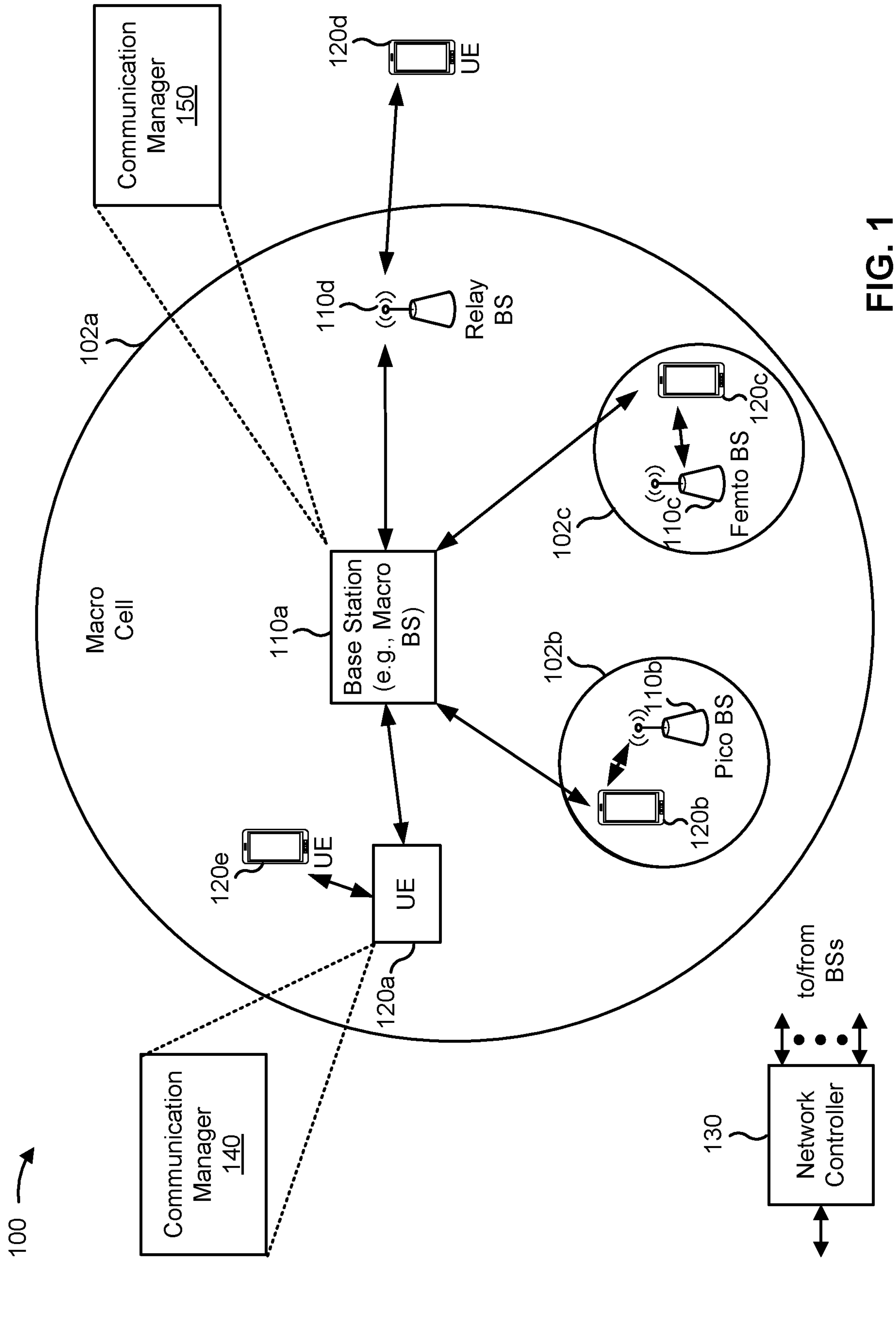
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration for transmitting a report that indicates multiple P-MPR values for a cell of a set of one or more cells indicated in the report; and transmit the report that indicates the multiple P-MPR values for the cell. Additionally, or alternatively, the communication manager 140 may perform one or more other operations described herein.

In some aspects, the base station 110 may include a communication manager 150. As described in more detail elsewhere herein, the communication manager 150 may transmit a configuration for transmitting a report that indicates multiple P-MPR values for a cell of a set of one or more cells indicated in the report; and receive the report that indicates the multiple P-MPR values for the cell. Additionally, or alternatively, the communication manager 150 may perform one or more other operations described herein.

As indicated above, FIG. 1 is provided as an example. Other examples may differ from what is described with regard to FIG. 1.

Figure 2:
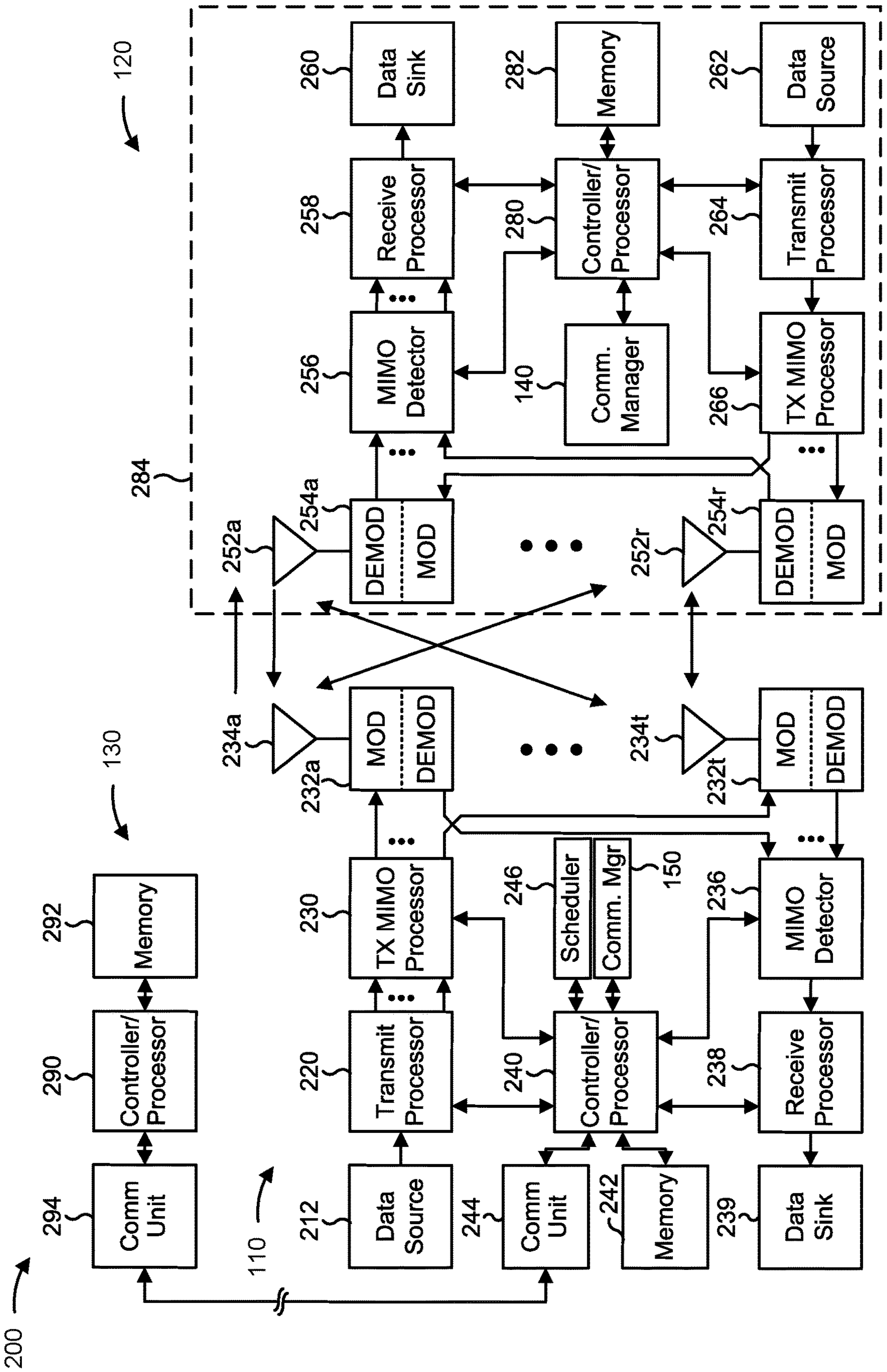
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with a report of multiple power-management maximum power reduction values, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving a configuration for transmitting a report that indicates multiple P-MPR values for a cell of a set of one or more cells indicated in the report; and/or means for transmitting the report that indicates the multiple P-MPR values for the cell. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a configuration for transmitting a report that indicates multiple P-MPR values for a cell of a set of one or more cells indicated in the report; and/or means for receiving the report that indicates the multiple P-MPR values for the cell. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
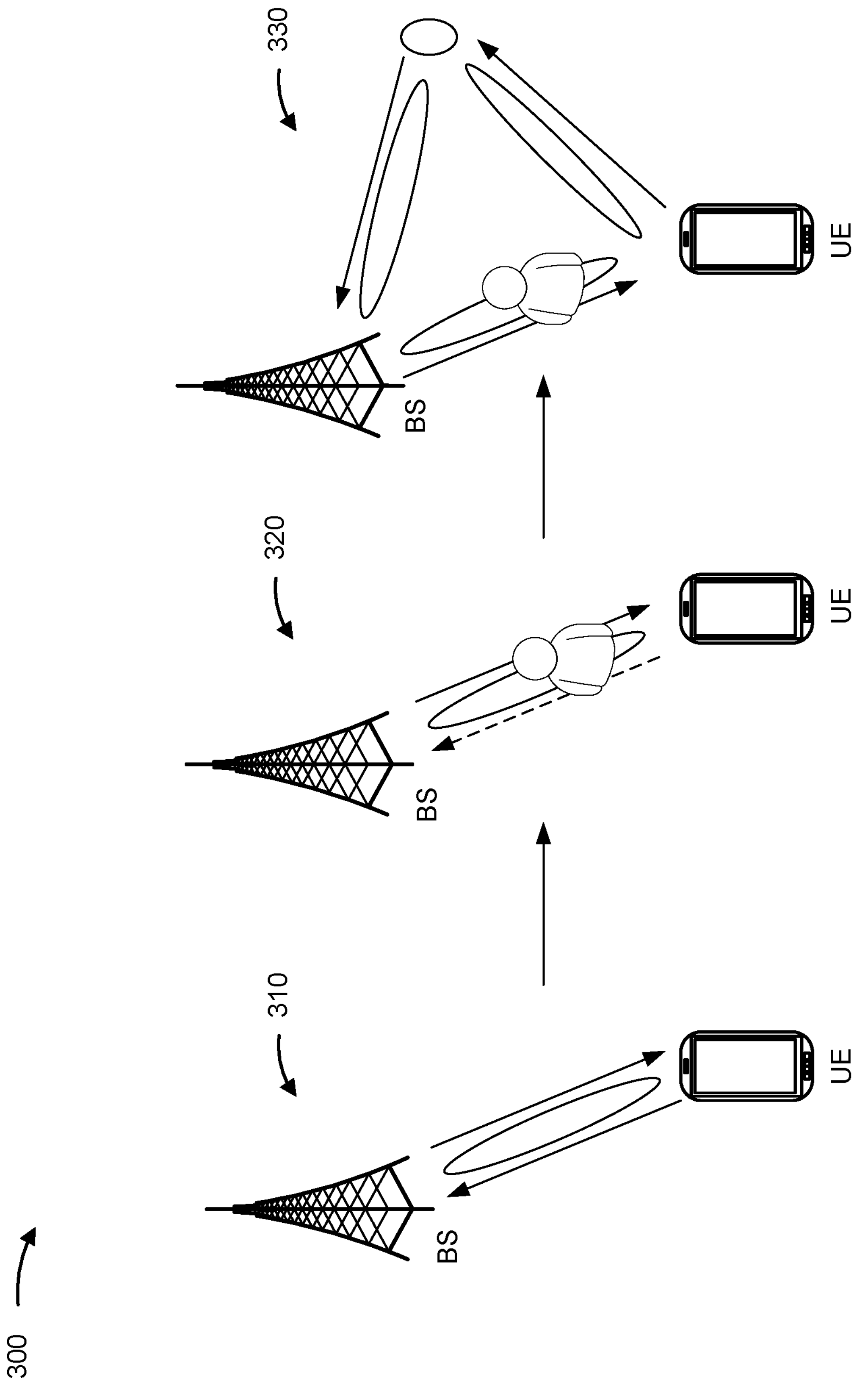
FIG. 3 is a diagram illustrating an example of identifying a maximum permissible exposure (MPE) event associated with a beam, in accordance with the present disclosure.

FIG. 3 is a diagram illustrating an example 300 of identifying a maximum permissible exposure (MPE) event associated with a beam, in accordance with the present disclosure.

As shown in FIG. 3, and by reference number 310, a UE and a base station may communicate using directional beams. In some wireless networks, a UE may communicate with a base station using directional beamforming to boost transmission power in one or more particular directions associated with one or more beams. By concentrating transmission power in one or more beams, an output energy associated with transmitting communications using the one or beams may be higher than if the UE performed an omni-directional transmission of the communications. This may increase a range for transmitting the communications, but may also cause an energy density of the communications to satisfy (e.g., exceed) an MPE value that defines a highest energy density that is allowed to be exposed to a human body, or other organic material, at close range. An MPE value may be defined via radio resource control (RRC) configurations, for example, to comply with a standard and/or a regulation. The standard and/or regulation may have different limits for different frequency bandwidths. For example, a limit (e.g., corresponding to the MPE value) may be lower for millimeter wave (mmWave) communications than for sub-6 GHz wave communications.

As shown by reference number 320, the UE may identify an MPE event. The UE may identify the MPE event based at least in part on detecting a part of a human body and/or other organic material at close range (e.g., within a threshold range) of the UE and within a path of an uplink beam. Based at least in part on detecting a part of a human body and/or other organic material in a direction of a beam for which transmissions would use an energy density that satisfies the MPE, the UE may reduce transmission power of one or more antennas (e.g., included in an antenna group and/or an antenna panel) that are associated with the beam. However, by reducing transmission power of the one or more antennas that are associated with the beam, the transmission may have insufficient power for the base station to receive the transmission. This may cause a beam failure.

As shown by reference number 330, the UE may resume communicating with the base station using a new beam for uplink communications. The new beam may be in a different direction from the beam associated with the MPE event.

As indicated above, FIG. 3 is provided as an example. Other examples may differ from what is described with regard to FIG. 3.

Figure 4:
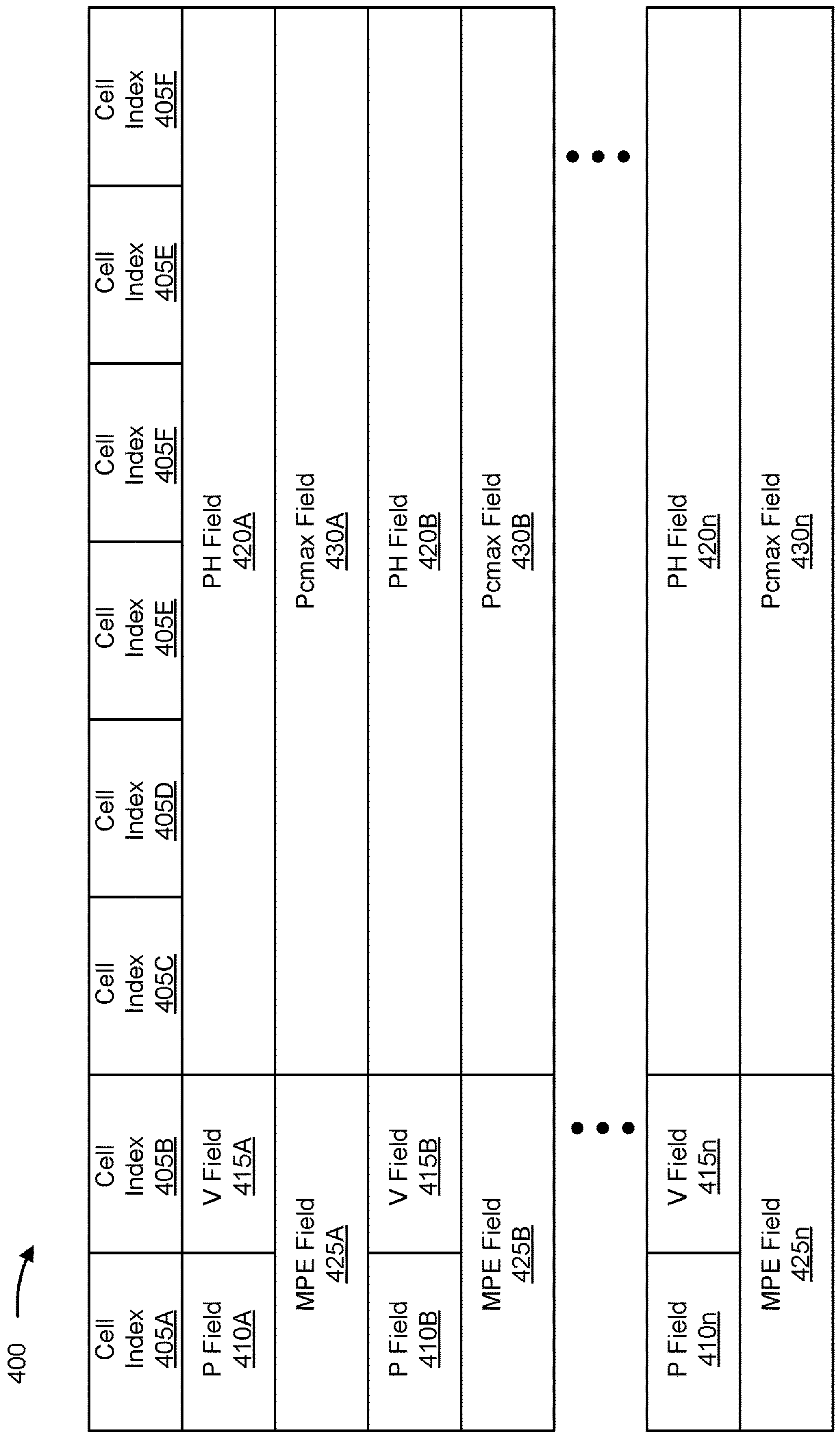
FIG. 4 is a diagram illustrating an example of single panel power headroom reporting, in accordance with the present disclosure.

FIG. 4 is a diagram illustrating an example 400 of single panel power headroom (PH) reporting, in accordance with the present disclosure. In some networks, a UE may transmit an indication of an MPE event using a PH report (PHR). The UE may transmit the PHR via one or more medium access control (MAC) control elements (MAC CEs).

As shown in FIG. 4, a PHR may include a set of one or more indications of cell indexes 405A-405F. The set of one or more indications of cell indexes 405A-405F may indicate (e.g., using a bitmap) one or more serving cells for which the PHR indicates a PH and/or one or more additional parameters. For example, cell index 405A may map to a first serving cell. A first value (e.g., 1) may indicate that the PHR includes one or more fields of information associated with the first serving cell. A second value (e.g., 0) may indicate that the PHR does not include fields of information associated with the first serving cell. The PHR may indicate that the PHR includes one or more fields of information associated with multiple serving cells.

The PHR may include one or more P fields 410A-410*n* (e.g., with a quantity based at least in part on the one or more indications of cell indexes 405A-405F). The one or more P fields 410A-410*n* may indicate whether a backoff (e.g., a power backoff) is less than a minimum power-management-based maximum power reduction (P-MPR) value (e.g., a P_MPR_0), if MPE reporting (e.g., MPE-Reporting) is configured for the PHR. For example, if MPE reporting is configured for the PHR, a value of 0 may indicate that the backoff is less than the minimum P-MPR value (e.g., a P-MPR threshold); otherwise, a value of 1 may indicate that the backoff is greater than or equal to than the minimum P-MPR value. If MPE reporting is not configured for the PHR, the field may indicate (e.g., with a value of 1) that a corresponding power management maximum power reduction for a carrier f of a serving cell ($P_{CMAX,f,c}$) would have had a different value than a reported value if no power backoff had been applied based at least in part on power management.

The PHR may include one or more V fields 415A-415*n* that may indicate whether a PH value is based at least in part on a real transmission (e.g., a scheduled transmission) or a reference format (e.g., as a virtual PH). In a case where the PHR includes information for only a single cell, the one or more V fields 415A-415*n* may consist of a single reserve bit (e.g., set to 0 for the PHR indicating the MPE event).

The PHR may also include one or more PH fields 420A-420*n* that may indicate, for each serving cell indicated with a cell index, a PH (e.g., a PH level) for an uplink communication associated with the PHR. The PHR may further include one or more MPE fields 425A-425*n* that may be used to indicate a UE-specific and/or a cell-specific (e.g., a serving cell indicated in the set of one or more cell indexes 405A-404F) MPE event. If MPE reporting is configured and the P field, for a particular serving cell, has a value that indicates that the backoff is not less than a minimum P-MPR value, the one or more MPE fields 425A-425*n* may indicate an applied power backoff used to satisfy MPE requirements. The one or more MPE fields 425A-425*n* may indicate indexes of corresponding measured values of P-MPR levels (e.g., in decibels). If MPE reporting is not configured, the one or more MPE fields 425A-425*n* may present reserved bits instead of the MPE event.

The PHR may also include one or more Pcmax fields 430A-430*n*. The one or more Pcmax fields 430A-430*n* may indicate, for each serving cell indicated with a cell index, a power management maximum power reduction for a carrier f of a serving cell c ($P_{CMAX,f,c}$).

As indicated above, FIG. 4 is provided as an example. Other examples may differ from what is described with regard to FIG. 4.

As described in connection with FIG. 4, a UE may report on PH-based metrics for different cells in a single PHR. However, the UE may be unable to report additional information to a base station, which additional information may have otherwise supported improved decision-making by the base station. For example, the UE reports PH-based metrics for only a single beam associated with each cell of the PHR. Based at least in part on the UE reporting PH-based metrics for only a single beam associated with each cell of the PHR, the base station may configure the UE with a configuration for communications that is suboptimal. For example, the base station may configure transmission parameters for the UE based at least in part on the PH-based metrics associated with a first beam based at least in part on the base station being unaware that a second beam may be configured with improved transmission parameters (e.g., with an increased transmit power). This may cause the base station to transmit with an unnecessarily low transmit power and/or with other suboptimal parameters that increase an error rate and/or decrease spectral efficiency (e.g., based at least in part on using an MCS that is associated with the unnecessarily low transmit power).

In some aspects described herein, a network (e.g., a base station and a UE) may support event-triggered P-MPR reporting (e.g., using one or more MAC CEs) with one or more information elements for each cell (e.g., each component carrier) and/or for each antenna group of the UE. For example, a first information element may indicate a PH value, a P value, a V value, a P-MPR value, and/or a Pcmax value (e.g., if reported). A second information element may include up to n P-MPR values, where a value of n may be fixed (e.g., based at least in part on a communication protocol) or may be configured, among other examples. For example, n may have a value of 0, 1, 2, or 4, among other examples. In some aspects, in the PHR report for a cell, the UE may report a set of n smallest P-MPR values among all candidate P-MPR values at the UEs for a cell.

In some aspects, for each P-MPR value, up to m resource indexes, where the resource indexes are selected by the UE from a candidate resource index pool. In some aspects, the resource indexes may include one or more synchronization signal block resource indexes (SSBRIs) and/or one or more channel state information reference signal (CSI-RS) resource indicators (CRIs), among other examples. In some aspects, a value of m may be fixed (e.g., based at least in part on a communication protocol) or may be configured, among other examples. For example, m may have a value of 0, 1, 2, or 4, among other examples.

For each resource index and/or for each P-MPR value, a PHR value or a modified PHR value may be reported, if enabled. The modified PHR value may be determined or calculated based on the metrics associated with the reported resource index or the reported P-MPR value. The PHR value may be panel specific if reported per each P-MPR value and common to multiple reported resource indexes associated with the P-MPR value, or may be beam specific if reported per each resource index and per each P-MPR value. For each resource index and/or for each P-MPR value, a beam metric (e.g., an RSRP value) may be reported, if enabled. An RSRP may be a measurement for downlink and/or for uplink, and is associated with the reported resource index. Dedicated bits may be applied to indicate whether each P-MPR value, resource index, RSRP value, and/or PHR value is reported or not in the PHR report for the cell (e.g., a portion of the PHR report indicating P-MPR values associated with the cell). A corresponding field may be reserved if not reported. In some aspects, in the PHR report for the cell, the UE may report a set of resource indexes with the first m largest PHR or RSRP values in a candidate resource index pool and associated with the reported P-MPR value for the cell.

The second information element may be reported differently depending on a P-MPR value reported in the first information element. For example, if the P-MPR value of the first information element satisfies a threshold (e.g., is greater than or equal to the threshold), the UE may report the second information element, whereas if the P-MPR value of the first information element fails to satisfy the threshold, the UE may not report the second information element. For example, if a P value of the first information is 0, the UE may not report the second information element. In some aspects, if the UE does not report the second information element, the corresponding fields for the second information element may be reserved with dummy bits. In some other aspects, if the UE does not report the second information element, the corresponding fields for the second information element may be ignored and reduced for overhead reduction.

In some aspects, P-MPR values and/or PH values in the first information element and/or the second information element may be configured for reporting using one or more quantization tables. For example, values of the first information element and the second information element may be indicated based at least in part on a same quantization table and/or with absolute values (e.g., independent and/or non-relative values).

In some aspects, values of the first information element and the second information element may be reported using different quantization tables. For example, values of the first information element may be indicated based at least in part on a first quantization table, and values of the second information element may be indicated based at least in part on a second quantization table. In some aspects, the first quantization table may be associated with absolute values, and the second quantization table may be associated with relative values (e.g., a differential value relative to values of the first information element or relative to values of another information element of the PHR). In some aspects, the first quantization table may indicate an absolute value for the first information element and a first part of a value (e.g., differential or absolute value) for the second information element, and the second quantization table may indicate a second part of the value for the second information element.

In some aspects, each reported resource index in the second information element may be configured with, or implicitly determined with, an associated transmission configuration indicator (TCI). The TCI may be configured for uplink communications by higher layer signaling, and may be activated or inactive.

In some aspects, the UE may trigger the report when any of multiple values (e.g., multiple PH values or multiple P-MPR values, among other examples) in the first information element and/or the second information element have changed by an amount that satisfies (e.g., is larger than) a threshold (e.g., a threshold defined in a communication protocol and/or in configuration information, among other examples). For example, the UE may trigger the report based at least in part on any of PH or P-MPR value changing by the amount that satisfies the threshold. In some aspects, the UE may trigger the report when a minimum value satisfies the threshold, all values satisfy the threshold, or an average of multiple values (e.g., multiple PH values or multiple P-MPR values, among other examples) of the first information element and/or the second information element satisfies the threshold. In some aspects, the UE may trigger the report when the value in the first information element (e.g., the PH value or the P-MPR value, among other examples) satisfies the threshold.

Based at least in part on the UE being able to report additional PH and/or P-MPR information to a base station in a PHR, the base station may have information to improve decision-making. For example, the UE reports PH-based metrics for multiple beams (e.g., associated with different resource indexes) associated with one or more cells of the PHR. Based at least in part on the UE reporting the PH-based metrics for the multiple beams associated with one or more cells of the PHR, the base station may configure the UE with a configuration for communication with improved transmit power and/or other parameters that decrease an error rate and/or increase spectral efficiency (e.g., based at least in part on using an MCS that is associated with the improved transmit power). In this way, the UE and the base station may conserve power, communication, computing, and/or network resources that may have otherwise been used to detect and/or correct communication errors and/or to communicate with an unnecessarily low spectral efficiency.

In some aspects, in the PHR report for a cell of one or more cells, the UE may report a number of n P-MPR values, and each of the n reported P-MPR values is associated with one reported resource index of SSBRI or CRI (i.e. m=1). The number of n may represent the number of reported resource indexes (or uplink beams) for a cell. The value of n may be configured by the base station and/or may be based on a UE capability reported from the UE to the base station. The UE capability may indicate at least a candidate value of n=1. The number of n reported resource indexes (or uplink beams) may be selected and reported in the PHR report by the UE based on an order according to their associated uplink RSRP values, where an uplink RSRP value may be the differential value of downlink RSRP and P-MPR value associated with the reported resource index. The downlink RSRP may be additionally reported per reported resource index for uplink RSRP computation.

In some aspects, if the UE is configured with multiple TRP or panel operations in a cell, the PHR report and the candidate resource index pool may be configured and reported per panel or per TRP for a cell. The UE may trigger the report if any panel or TRP has triggered the PHR report, for example, if a PH value or P-MPR value associated with one of multiple panels or TRPs has changed larger than a threshold.

Figure 5:
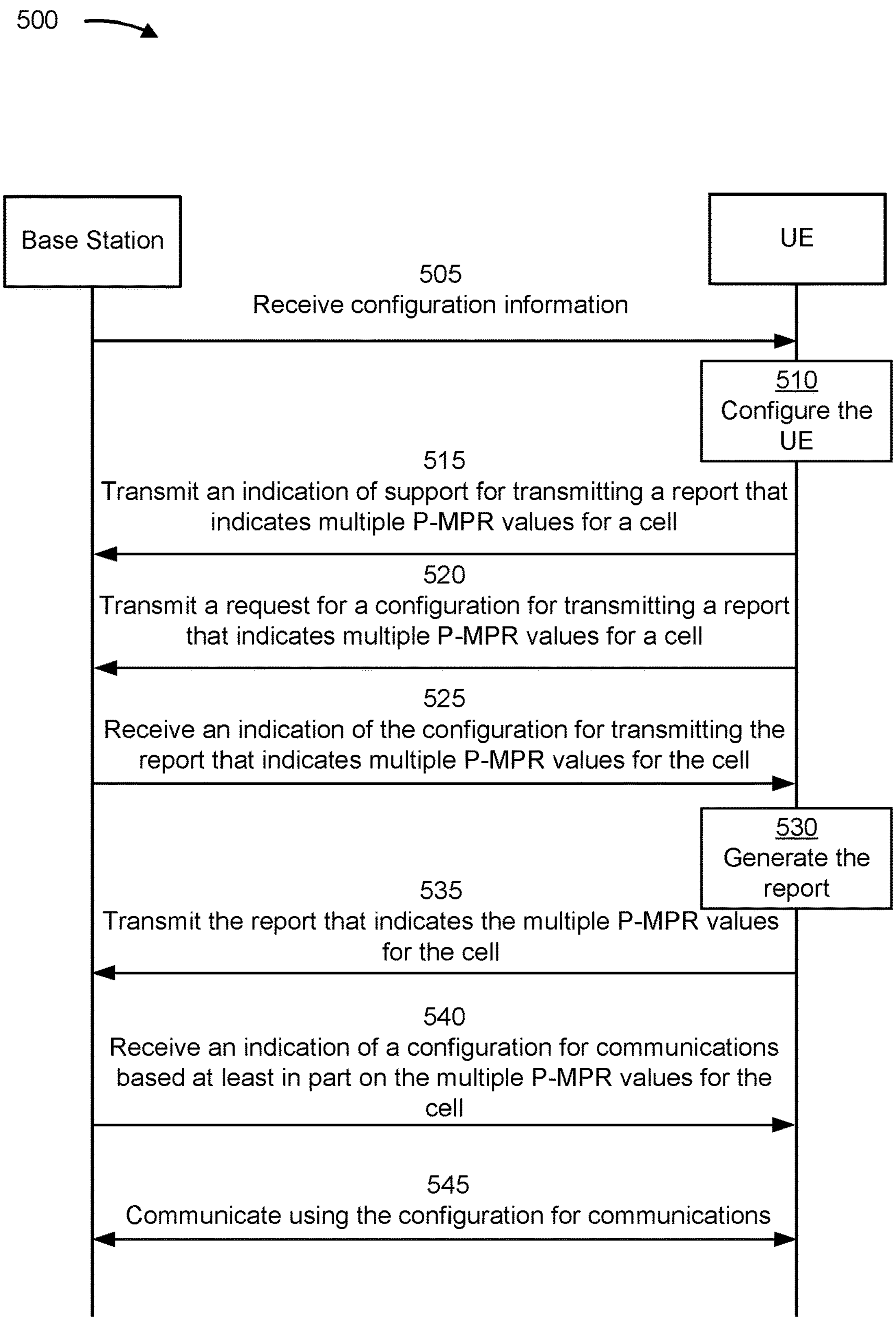
FIGS. 5-7 are diagrams illustrating examples associated with a report of multiple power-management maximum power reduction values, in accordance with the present disclosure.

FIG. 5 is a diagram illustrating an example 500 associated with using a report of multiple power-management maximum power reduction values (e.g., per cell), in accordance with the present disclosure. As shown in FIG. 5, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 5.

As shown by reference number 505, the base station may transmit, and the UE may receive, configuration information. In some aspects, the UE may receive the configuration information via one or more of RRC signaling. MAC CEs, or downlink control information (DCI), among other examples. In some aspects, the configuration information may include an indication of one or more configuration parameters (e.g., already known to the UE) for selection by the UE, or explicit configuration information for the UE to use to configure the UE, among other examples.

In some aspects, the configuration information may indicate that the UE is to transmit a report that indicates multiple P-MPR values for a cell of a set of cells indicated in a report (e.g., a PHR). In some aspects, the configuration information may indicate one or more parameters for transmitting the report, such as a quantity of PH values, a quantity of P-MPR values, and/or a quantity of resources indexes (e.g., SSBRIs and/or CRIs, among other examples) to include in the report.

As shown by reference number 510, the UE may configure itself based at least in part on the configuration information. In some aspects, the UE may be configured to perform one or more operations described herein based at least in part on the configuration information.

As shown by reference number 515, the UE may transmit, and the base station may receive, an indication of support for transmitting a report that indicates multiple P-MPR values for a cell (e.g., a cell of a set of cells indicated in the report). In some aspects, the UE may transmit the indication of support via RRC signaling (e.g., in a capabilities report) or via uplink control information, among other examples. In some aspects, the indication of support may indicate a number of PH values, P-MPR values, and/or resource indexes, among other examples, that the UE supports for reporting.

As shown by reference number 520, the UE may transmit, and the base station may receive, a request for a configuration for transmitting the report that indicates multiple P-MPR values for the cell. In some aspects, the UE may transmit the request via one or more MAC CEs or uplink control information, among other examples.

In some aspects, the request may indicate a request to transmit the report with indications for multiple P-MPR values for the cell and/or additional indications for multiple P-MPR values for one or more additional cells. In some aspects, the UE may transmit the request based at least in part on an amount of change in one or more P-MPR values, of the multiple P-MPR values, that satisfies a threshold. For example, the UE may transmit the request based at least in part on detecting that any one of the P-MPR values has changed by an amount that satisfies the threshold, detecting that all of the P-MPR values have changed by an amount that satisfies the threshold, and/or detecting that an average value of the P-MPR values have changed by an amount that satisfies the threshold, among other examples.

As shown by reference number 525, the UE may receive, and the base station may transmit, an indication of the configuration for transmitting the report that indicates multiple P-MPR values for the cell. In some aspects, the UE may transmit the indication of the configuration via one or more of RRC signaling, one or more MAC CEs, and/or DCI. The UE may be configured (e.g., via RRC signaling and/or via a communication protocol, among other examples) with one or more candidate parameters and/or one or more configurations, and the UE may receive additional signaling to select a set of parameters of the one or more parameters and/or a configuration from the one or more configurations.

In some aspects, the configuration may indicate a quantity of the multiple P-MPR values. The configuration may indicate a quantity of one or more resource indexes associated with the multiple P-MPR values within the report. In some aspects, the configuration may indicate a format for providing the multiple P-MPR values within the report. In some aspects, the configuration may indicate to transmit the report based at least in part on indications of one or more of quasi-co-location (QCL) information or a TCI state identification associated with the multiple P-MPR values. For example, the configuration may identify which P-MPR values to include in the report based at least in part on an indicating the QCL information and/or the TCI state identification.

As shown by reference number 530, the UE may generate the report that indicates multiple P-MPR values for the cell. In some aspects, the multiple P-MPR values may include an indication of a first P-MPR value and an indication of a second P-MPR value, where a format for the indication of the second P-MPR value is based at least in part on the first P-MPR value. In some aspects, the report includes the indication of the second P-MPR value based at least in part on the first P-MPR value. For example, the report includes the indication of the second P-MPR value based at least in part on the first P-MPR value satisfying a threshold or having a defined value, among other examples. In some aspects, the report indicates multiple P-MPR values for a second cell, for a subset of cells indicated in the report, or for each cell indicated in the report.

In some aspects, the first P-MPR value, or a first associated PH value, may be indicated using a same quantization table as the second P-MPR value, or a second associated PH value. In some aspects, the first P-MPR value, or the first associated PH value, may be indicated using a first quantization table and the second P-MPR value, or the second associated PH value, may be indicated using a second quantization table that is different from the first quantization table. For example, the second quantization table may indicate a differential value relative to the first P-MPR value or the first associated PH value. Additionally, or alternatively, the first quantization table may indicate the first P-MPR value, or the first associated PH value, and a first portion of the second P-MPR value and the second quantization table may indicate a second portion of the second P-MPR value.

In some aspects, a quantity of the multiple P-MPR values for the cell is based at least in part on a configuration indicated by a base station associated with at least one of the one or more cells indicated in the report, or a communication protocol associated with the report, among other examples.

In some aspects, the report indicates (e.g., for each of the multiple P-MPR values) one or more resource indexes. The one or more resource indexes may be selected from a set of candidate resource indexes associated with a resource pool (e.g., configured by the base station). In some aspects, the multiple resource indexes may be associated with QCL information or a TCI state, among other examples. In some aspects, the UE may include a quantity of the one or more resource indexes that is based at least in part on a configuration indicated by a base station associated with at least one of the one or more cells indicated in the report (e.g., the base station), or a communication protocol associated with the report, among other examples. For example, the configuration may be indicated in connection with reference number 505 and/or 525.

In some aspects, the report indicates (e.g., for each of the multiple P-MPR values or for each resource index associated with each of the multiple P-MPR values) a PH value. In some aspects, the report indicates (e.g., for each of the multiple P-MPR values or for each resource index associated with each of the multiple P-MPR values) an RSRP value.

In some aspects, the report may include an indication of whether the report includes an additional P-MPR value for the cell, an indication of whether the report includes a resource index associated with the additional P-MPR value for the cell, and/or an indication of whether the report includes a PH value associated with the additional P-MPR value for the cell. For example, the report may include one or more indications of information included in a second information element of the report. The one or more indications may be included in fields of the report.

As shown by reference number 535, the UE may transmit, and the base station may receive, the report that indicates multiple P-MPR values for the cell. In some aspects, the UE may transmit the report via one or more MAC CEs that include multiple information elements for at least one indicated cell.

As shown by reference number 540, the UE may receive, and the base station may transmit, an indication of a configuration for communications based at least in part on the multiple P-MPR values for the cell. For example, the configuration for communications may indicate a beam to use for uplink communications based at least in part on the multiple P-MPR values for the cell. The base station may indicate the beam based at least in part on a TCI state identification, QCL information, the one or more resource indexes, and/or spatial information, among other examples. The configuration for communications may indicate one or more power parameters based at least in part on the report. For example, the configuration for communications may indicate a beam and a transmit power to use for uplink communications based at least in part on the report.

As shown by reference number 545, the UE and the base station may communicate using the configuration for the communications. In some aspects, the UE may configure one or more components of the UE to transmit uplink communications using the configuration for communications indicated in connection with reference number 540.

Based at least in part on the UE reporting additional PH and/or P-MPR information to the base station in the PHR, the base station has information to improve decision-making for configuring transmission parameters of the UE for the communications. In this way, the UE and the base station may conserve power, communication, computing, and/or network resources that may have otherwise been used to detect and/or correct communication errors and/or to communicate with an unnecessarily low spectral efficiency.

As indicated above, FIG. 5 is provided as an example. Other examples may differ from what is described with regard to FIG. 5.

Figure 6:
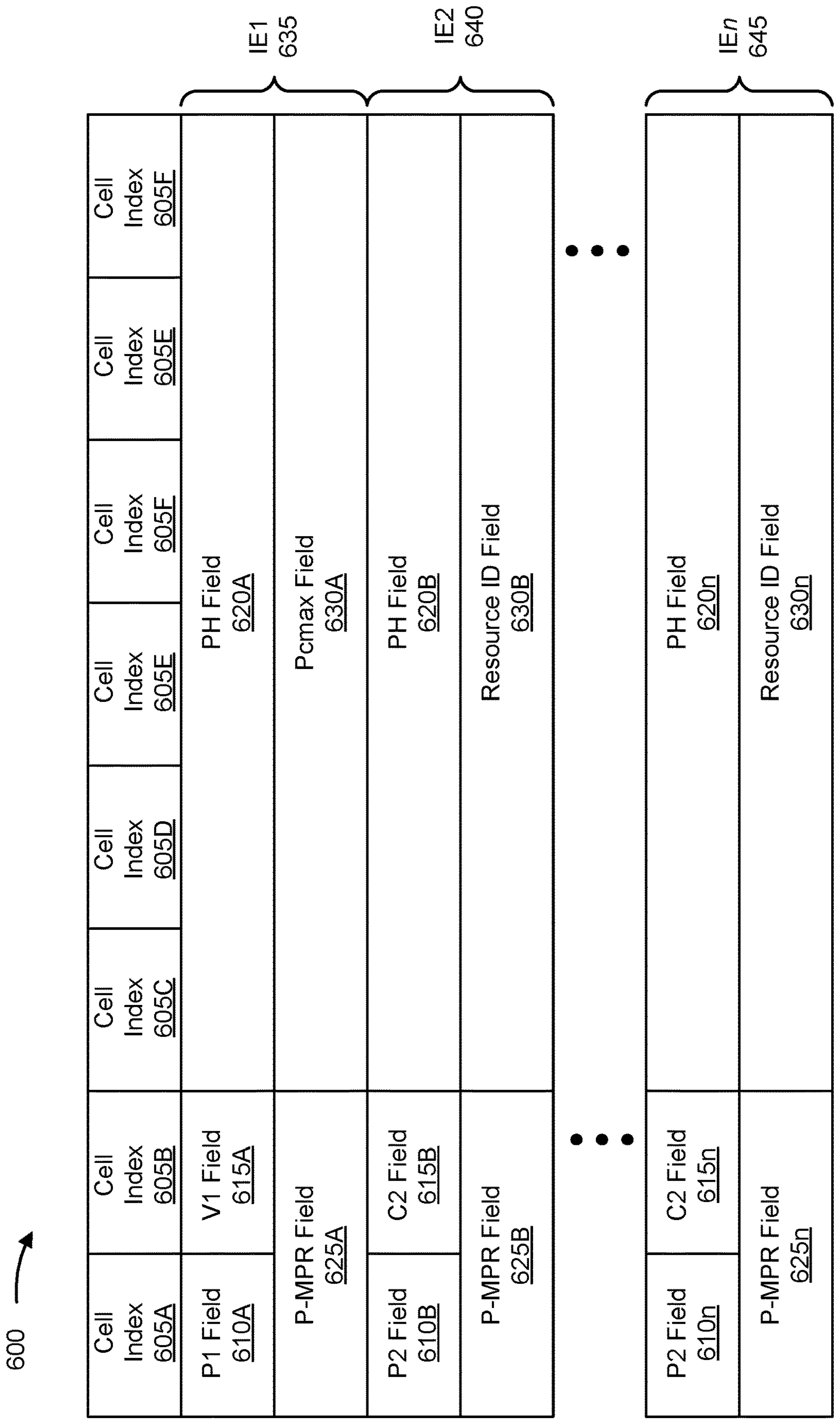

FIG. 6 is a diagram illustrating an example 600 associated with communicating using UE-supported beamforming configurations (e.g., per cell), in accordance with the present disclosure. As shown in FIG. 6, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 6.

As shown in FIG. 6, a report (e.g., a PHR) that indicates multiple P-MPR values for a cell of a set of one or more cells indicated in the report may include multiple fields to indicate the P-MPR values and associated information. The report may include a set of one or more indications of cell indexes 605A-605F. The set of one or more indications of cell indexes 605A-605F may be used to indicate (e.g., using a bitmap) one or more serving cells for which the report indicates a PH and/or one or more additional parameters. For example, cell index 605A may map to a first serving cell. A first value (e.g., 1) may indicate that the PHR includes one or more fields of information associated with the first serving cell. A second value (e.g., 0) may indicate that the PHR does not include fields of information associated with the first serving cell. The PHR may indicate that the PHR includes one or more fields of information associated with multiple serving cells.

The report may include a P1 field 610A, a V1 field 615A, a PH field 620A, a P-MPR field 625A, and a Pcmax field 630A having one or more characteristics described in connection with FIG. 4. The PH field 620A may indicate a PH type (e.g., Type X), a cell index, and/or a panel identification (e.g., an antenna group identification). The P-MPR field 625A may indicate a P-MPR value (e.g., P-MPR1) based at least in part on a value of the P1 field 610A (e.g., 1) or may be reserved based at least in part on the value of the P1 field 610A (e.g., 0). The Pcmax field 630A may include an indication of a Pcmax value based at least in part on a value of the V1 field 615A (e.g., 1) or may be reserved based at least in part on the value of the V1 field 615A (e.g., 0). These fields may be part of a first information element (IE1) 635.

The first information element may indicate a P-MPR value for a first beam of a cell (e.g., currently-used beam).

The report may also include a P2 field 610B, a C2 field 615B, a PH field 620B, a P-MPR field 625B, and a resource ID field 630B. The P2 field 610B may indicate a P value based at least in part on a value of the C2 field 615B (e.g., 1) or may be reserved based at least in part on the value of the C2 field 615B (e.g., 0). The PH field 620B may indicate a PH type (e.g., Type X), a cell index, and/or a panel identification (e.g., an antenna group identification) based at least in part on the value of the C2 field 615B (e.g., 1) or may be reserved based at least in part on the value of the C2 field 615B (e.g., 0). The P-MPR field 625A may indicate a P-MPR value (e.g., P-MPR1) based at least in part on the value of the C2 field 615B (e.g., 1) or may be reserved based at least in part on the value of the C2 field 615B (e.g., 0). The resource ID field 630B may include an indication of a resource identification (e.g., SSBRI or a CRI, among other examples) based at least in part on the value of the C2 field 615B (e.g., 1) or may be reserved based at least in part on the value of the C2 field 615B (e.g., 0). These fields may be part of a second information element (IE2) 640. The second information element may indicate a P-MPR value for a second beam of the cell (e.g., indicated based at least in part on the resource index).

The report may also include a P2 field 610*n*, a C2 field 615*n*, a PH field 620*n*, a P-MPR field 625*n*, and a resource ID field 630*n*. The P2 field 610*n* may indicate a P value based at least in part on a value of the C2 field 615*n* (e.g., 1) or may be reserved based at least in part on the value of the C2 field 615*n* (e.g., 0). The PH field 620*n* may indicate a PH type (e.g., Type X), a cell index, and/or a panel identification (e.g., an antenna group identification) based at least in part on the value of the C2 field 615*n* (e.g., 1) or may be reserved based at least in part on the value of the C2 field 615*n* (e.g., 0). The P-MPR field 625*n* may indicate a P-MPR value (e.g., P-MPR1) based at least in part on the value of the C2 field 615*n* (e.g., 1) or may be reserved based at least in part on the value of the C2 field 615*n* (e.g., 0). The resource ID field 630*n* may include an indication of a resource identification (e.g., SSBRI or a CRI, among other examples) based at least in part on the value of the C2 field 615*n* (e.g., 1) or may be reserved based at least in part on the value of the C2 field 615*n* (e.g., 0). These fields may be part of an nth information element (IEn) 645. The information element may indicate a P-MPR value for an nth beam of the cell (e.g., indicated based at least in part on the resource index).

As indicated above, FIG. 6 is provided as an example. Other examples may differ from what is described with regard to FIG. 6.

Figure 7:
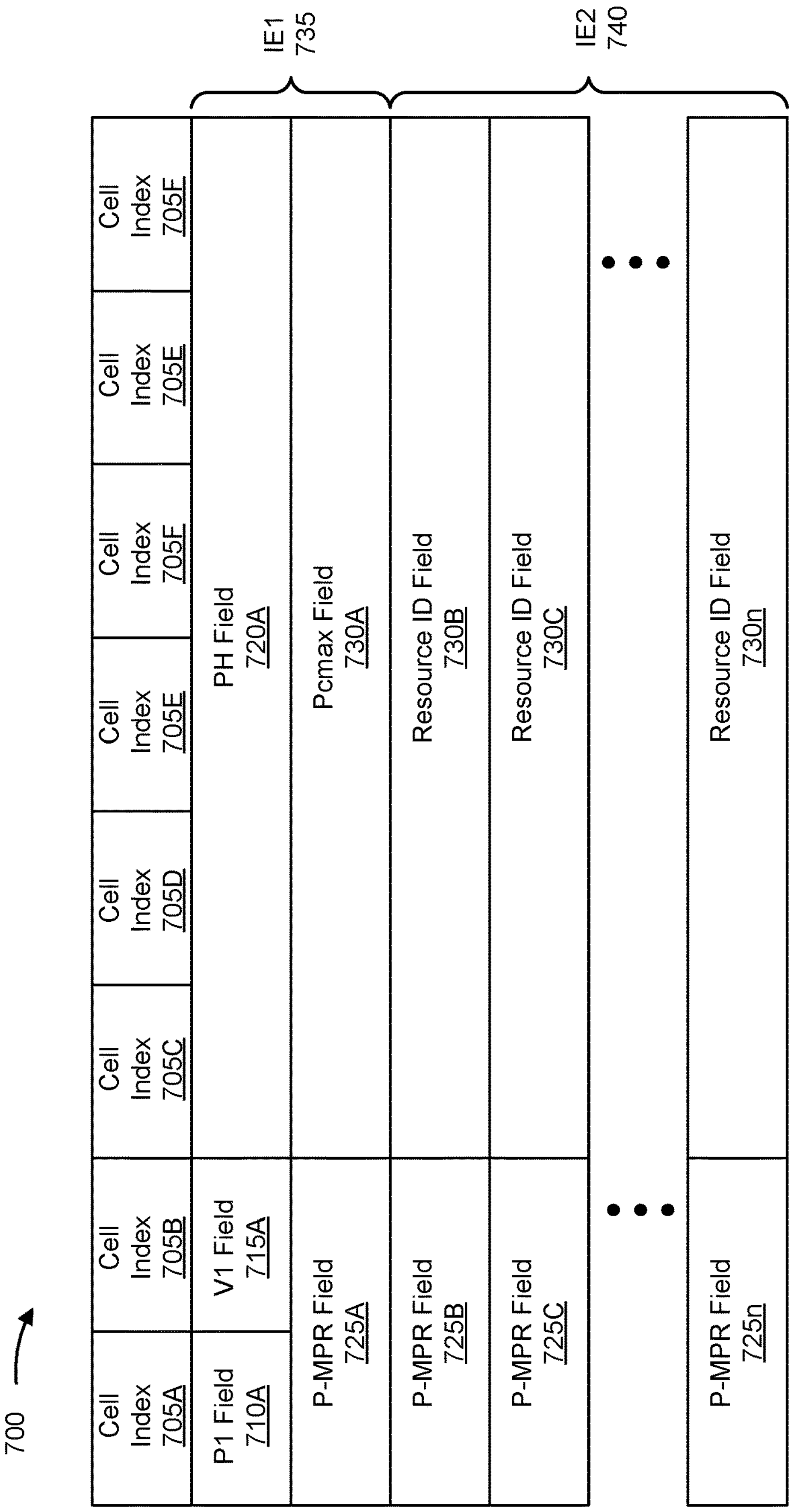

FIG. 7 is a diagram illustrating an example 700 associated with communicating using UE-supported beamforming configurations (e.g., per cell), in accordance with the present disclosure. As shown in FIG. 7, a base station (e.g., base station 110) may communicate with a UE (e.g., UE 120). In some aspects, the base station and the UE may be part of a wireless network (e.g., wireless network 100). The UE and the base station may have established a wireless connection prior to operations shown in FIG. 7.

As shown in FIG. 7, a report (e.g., a PHR) that indicates multiple P-MPR values for a cell of a set of one or more cells indicated in the report may include multiple fields to indicate the P-MPR values an associated information. The report may include a set of one or more indications of cell indexes 705A-705F. The set of one or more indications of cell indexes 705A-705F may be used to indicate (e.g., using a bitmap) one or more serving cells for which the report indicates a PH and/or one or more additional parameters. For example, cell index 705A may map to a first serving cell. A first value (e.g., 1) may indicate that the PHR includes one or more fields of information associated with the first serving cell. A second value (e.g., 0) may indicate that the PHR does not include fields of information associated with the first serving cell. The PHR may indicate that the PHR includes one or more fields of information associated with multiple serving cells.

The report may include a P1 field 710A, a V1 field 715A, a PH field 720A, a P-MPR field 725A, and a Pcmax field 730A having one or more characteristics described in connection with FIG. 4. The PH field 720A may indicate a PH type (e.g., Type X), a cell index, and/or a panel identification (e.g., an antenna group identification). The P-MPR field 725A may indicate a P-MPR value (e.g., P-MPR1) based at least in part on a value of the P1 field (e.g., 1) or may be reserved based at least in part on the value of the P1 field (e.g., 0). The Pcmax field 730A may include an indication of a Pcmax value based at least in part on a value of the V1 field (e.g., 1) or may be reserved based at least in part on the value of the V1 field (e.g., 0). These fields may be part of a first information element (IE1) 735. The first information element may indicate a P-MPR value for a first beam of a cell (e.g., currently-used beam).

The report may also include a set of one or more P-MPR fields 725B-725*n* and a set of resource identification fields 730B-730*n* within a second information element 740. The set of one or more P-MPR fields 725B-725*n* may indicate P-MPR values (e.g., P-MPR1 through P-MPRx) based at least in part on a configuration of a quantity n P-MPR values and/or a quantity m resource indexes to include for all, some, or a particular cell indicated within the report. The P-MPR values may be absolute values, may be a difference from the P-MPR1 of the first information element 735, or a previous P-MPR value in the second information element 740, among other examples. The resource identification fields 730B-730*n* may include indications of resource identifications (e.g., SSBRI or a CRI, among other examples) based at least in part on an associated P-MPR value. For example, a resource identification field may indicate a resource identification based at least in part on a difference (e.g., delta) between an associated P-MPR value and the P-MPR1 satisfying a threshold. In some aspects, the resource identification field may be a reserved field based at least in part on the associated P-MPR value.

As indicated above, FIG. 7 is provided as an example. Other examples may differ from what is described with regard to FIG. 7.

Figure 8:
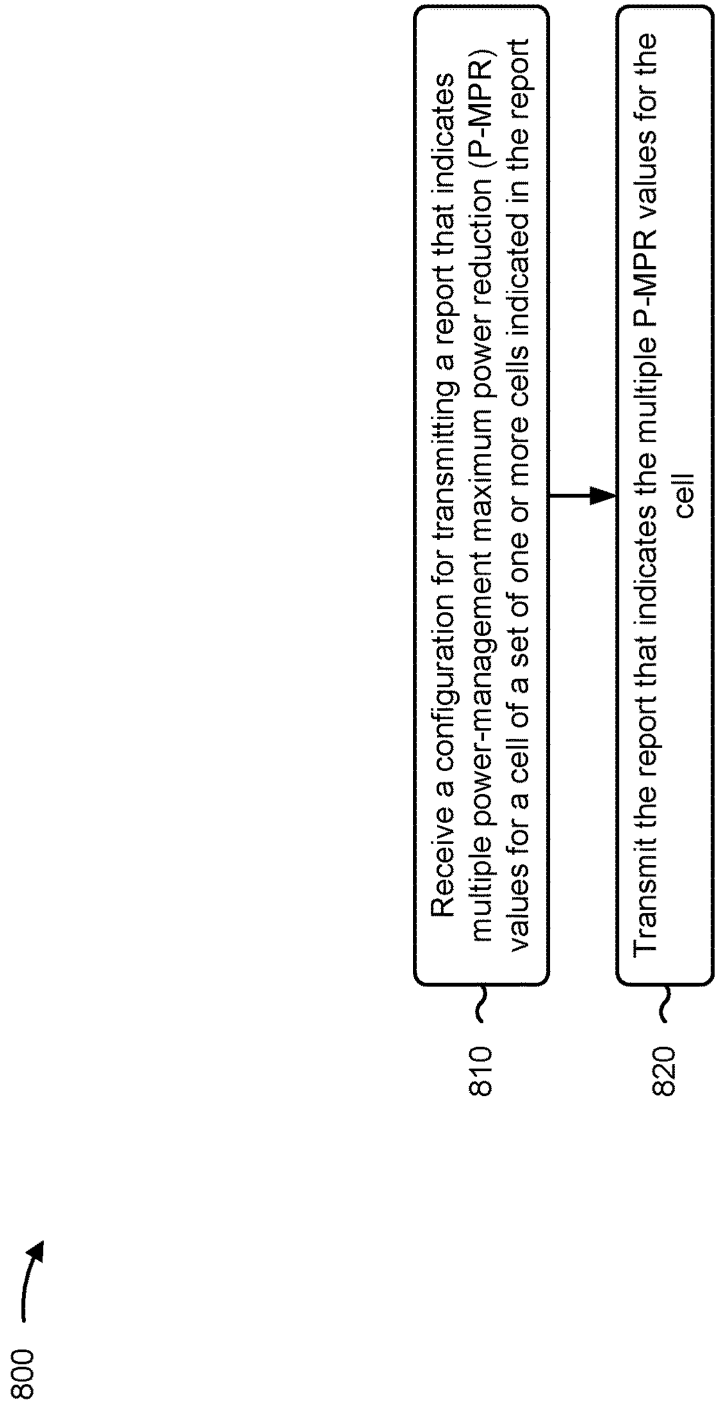
FIGS. 8 and 9 are diagrams illustrating example processes associated with a report of multiple power-management maximum power reduction values, in accordance with the present disclosure.

FIG. 8 is a diagram illustrating an example process 800 performed, for example, by a UE, in accordance with the present disclosure. Example process 800 is an example where the UE (e.g., UE 120) performs operations associated with report of multiple P-MPR values (e.g., per cell).

As shown in FIG. 8, in some aspects, process 800 may include receiving a configuration for transmitting a report that indicates multiple P-MPR values for a cell of a set of one or more cells indicated in the report (block 810). For example, the UE (e.g., using communication manager 140 and/or reception component 1002, depicted in FIG. 10) may receive a configuration for transmitting a report that indicates multiple P-MPR values for a cell of a set of one or more cells indicated in the report, as described above.

As further shown in FIG. 8, in some aspects, process 800 may include transmitting the report that indicates the multiple P-MPR values for the cell (block 820). For example, the UE (e.g., using communication manager 140 and/or transmission component 1004, depicted in FIG. 10) may transmit the report that indicates the multiple P-MPR values for the cell, as described above.

Process 800 may include additional aspects, such as any single aspect or any combination of aspects described below and/or in connection with one or more other processes described elsewhere herein.

In a first aspect, a quantity of the multiple P-MPR values for the cell is based at least in part on one or more of a configuration indicated by a base station associated with at least one of the one or more cells indicated in the report, or a communication protocol associated with the report.

In a second aspect, alone or in combination with the first aspect, the report indicates, for each of the multiple P-MPR values, one or more resource indexes.

In a third aspect, alone or in combination with one or more of the first and second aspects, the one or more resource indexes are selected from a set of candidate resource indexes associated with a resource pool.

In a fourth aspect, alone or in combination with one or more of the first through third aspects, a quantity of the one or more resource indexes is based at least in part on one or more of a configuration indicated by a base station associated with at least one of the one or more cells indicated in the report, or a communication protocol associated with the report.

In a fifth aspect, alone or in combination with one or more of the first through fourth aspects, the report indicates, for each of the multiple P-MPR values or for each resource index associated with each of the multiple P-MPR values, a PH value.

In a sixth aspect, alone or in combination with one or more of the first through fifth aspects, the report indicates, for each of the multiple P-MPR values or for each resource index associated with each of the multiple P-MPR values, an RSRP value.

In a seventh aspect, alone or in combination with one or more of the first through sixth aspects, the report includes one or more of an indication of whether the report includes an additional P-MPR value for the cell, an indication of whether the report includes a resource index associated with the additional P-MPR value for the cell, or an indication of whether the report includes a PH value associated with the additional P-MPR value for the cell.

In an eighth aspect, alone or in combination with one or more of the first through seventh aspects, the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

In a ninth aspect, alone or in combination with one or more of the first through eighth aspects, the multiple P-MPR values include an indication of a first P-MPR value and an indication of a second P-MPR value, and the first P-MPR value, or a first associated PH value, is indicated using a same quantization table as the second P-MPR value, or a second associated PH value, or the first P-MPR value, or the first associated PH value, is indicated using a first quantization table and the second P-MPR value, or the second associated PH value, is indicated using a second quantization table that is different from the first quantization table.

In a tenth aspect, alone or in combination with one or more of the first through ninth aspects, the second quantization table indicates a differential value relative to the first P-MPR value or the first associated PH value, or wherein the first quantization table indicates the first P-MPR value, or the first associated PH value, and a first portion of the second P-MPR value and the second quantization table indicates a second portion of the second P-MPR value.

In an eleventh aspect, alone or in combination with one or more of the first through tenth aspects, the report includes multiple resource indexes that are associated with one or more of QCL information or a transmission configuration state.

In a twelfth aspect, alone or in combination with one or more of the first through eleventh aspects, the configuration indicates to transmit the report that indicates the multiple P-MPR values based at least in part on indications of one or more of QCL information or a transmission configuration state identification associated with the multiple P-MPR values.

In a thirteenth aspect, alone or in combination with one or more of the first through twelfth aspects, process 800 includes transmitting a request for the configuration for transmitting the report that indicates multiple P-MPR values for the cell.

In a fourteenth aspect, alone or in combination with one or more of the first through thirteenth aspects, transmitting the request for the configuration for transmitting the report that indicates multiple P-MPR values for the cell is based at least in part on an amount of change in one or more P-MPR values, of the multiple P-MPR values, that satisfies a threshold.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
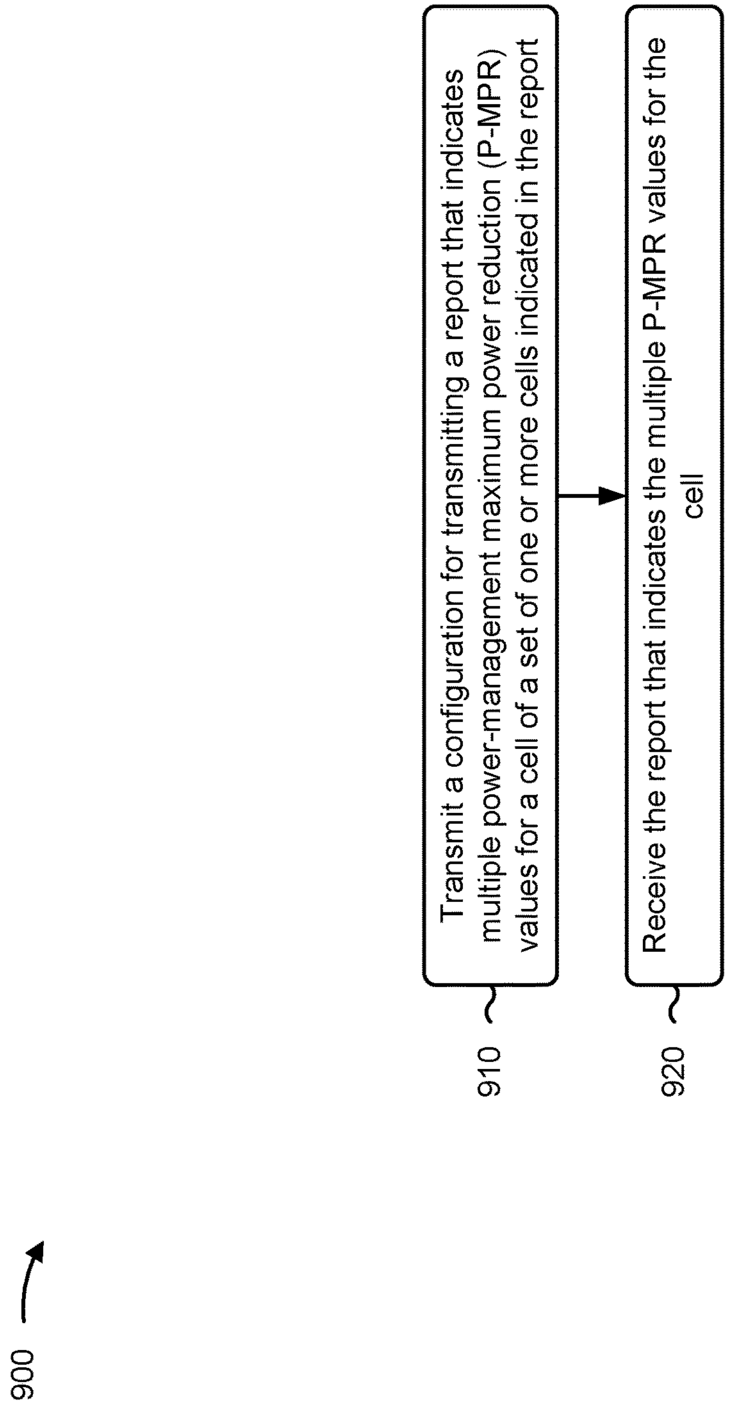

FIG. 9 is a diagram illustrating an example process 900 performed, for example, by a base station, in accordance with the present disclosure. Example process 900 is an example where the base station (e.g., base station 110) performs operations associated with report of multiple P-MPR values (e.g., per cell).

As shown in FIG. 9, in some aspects, process 900 may include transmitting a configuration for transmitting a report that indicates multiple P-MPR values for a cell of a set of one or more cells indicated in the report (block 910). For example, the base station (e.g., using communication manager 150 and/or transmission component 1104, depicted in FIG. 11) may transmit a configuration for transmitting a report that indicates multiple P-MPR values for a cell of a set of one or more cells indicated in the report, as described above.

As further shown in FIG. 9, in some aspects, process 900 may include receiving the report that indicates the multiple P-MPR values for the cell (block 920). For example, the base station (e.g., using communication manager 150 and/or reception component 1102, depicted in FIG. 11) may receive the report that indicates the multiple P-MPR values for the cell, as described above.

Process 900 may include additional aspects, such as any single aspect or any combination of aspects described below and/or in connection with one or more other processes described elsewhere herein.

In a first aspect, a quantity of the multiple P-MPR values for the cell is based at least in part on one or more of a configuration indicated by the base station, or a communication protocol associated with the report.

In a second aspect, alone or in combination with the first aspect, the report indicates, for each of the multiple P-MPR values, one or more resource indexes.

In a third aspect, alone or in combination with one or more of the first and second aspects, the one or more resource indexes are selected from a set of candidate resource indexes associated with a resource pool.

In a fourth aspect, alone or in combination with one or more of the first through third aspects, a quantity of the one or more resource indexes is based at least in part on one or more of a configuration indicated by the base station, or a communication protocol associated with the report.

In a fifth aspect, alone or in combination with one or more of the first through fourth aspects, the report indicates, for each of the multiple P-MPR values or for each resource index associated with each of the multiple P-MPR values, a PH value.

In a sixth aspect, alone or in combination with one or more of the first through fifth aspects, the report indicates, for each of the multiple P-MPR values or for each resource index associated with each of the multiple P-MPR values, a reference signal received power value.

In a seventh aspect, alone or in combination with one or more of the first through sixth aspects, the report includes one or more of an indication of whether the report includes an additional P-MPR value for the cell, an indication of whether the report includes a resource index associated with the additional P-MPR value for the cell, or an indication of whether the report includes a PH value associated with the additional P-MPR value for the cell.

In an eighth aspect, alone or in combination with one or more of the first through seventh aspects, the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

In a ninth aspect, alone or in combination with one or more of the first through eighth aspects, the multiple P-MPR values include an indication of a first P-MPR value and an indication of a second P-MPR value, and the first P-MPR value, or a first associated PH value, is indicated using a same quantization table as the second P-MPR value, or a second associated PH value, or the first P-MPR value, or the first associated PH value, is indicated using a first quantization table and the second P-MPR value, or the second associated PH value, is indicated using a second quantization table that is different from the first quantization table.

In a tenth aspect, alone or in combination with one or more of the first through ninth aspects, the second quantization table indicates a differential value relative to the first P-MPR value or the first associated PH value, or wherein the first quantization table indicates the first P-MPR value, or the first associated PH value, and a first portion of the second P-MPR value and the second quantization table indicates a second portion of the second P-MPR value.

In an eleventh aspect, alone or in combination with one or more of the first through tenth aspects, the report includes multiple resource indexes that are associated with one or more of QCL information or a transmission configuration state.

In a twelfth aspect, alone or in combination with one or more of the first through eleventh aspects, the configuration indicates to transmit the report that indicates the multiple P-MPR values based at least in part on indications of one or more of QCL information or a transmission configuration state identification associated with the multiple P-MPR values.

In a thirteenth aspect, alone or in combination with one or more of the first through twelfth aspects, process 900 includes receiving a request for the configuration for transmitting the report that indicates multiple P-MPR values for the cell.

In a fourteenth aspect, alone or in combination with one or more of the first through thirteenth aspects, transmitting the request for the configuration for transmitting the report that indicates multiple P-MPR values for the cell is based at least in part on an amount of change in one or more P-MPR values, of the multiple P-MPR values, that satisfies a threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
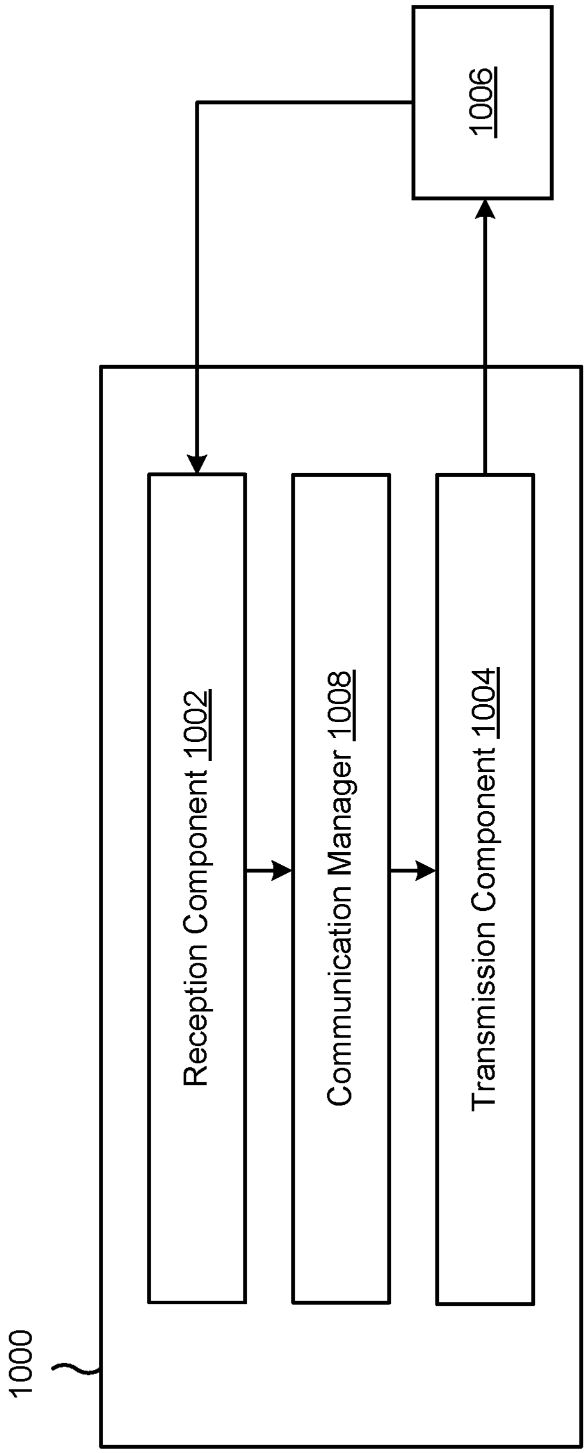
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a configuration for transmitting a report that indicates multiple P-MPR values for a cell of a set of one or more cells indicated in the report. The transmission component 1004 may transmit the report that indicates the multiple P-MPR values for the cell.

The transmission component 1004 may transmit a request for the configuration for transmitting the report that indicates multiple P-MPR values for the cell.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
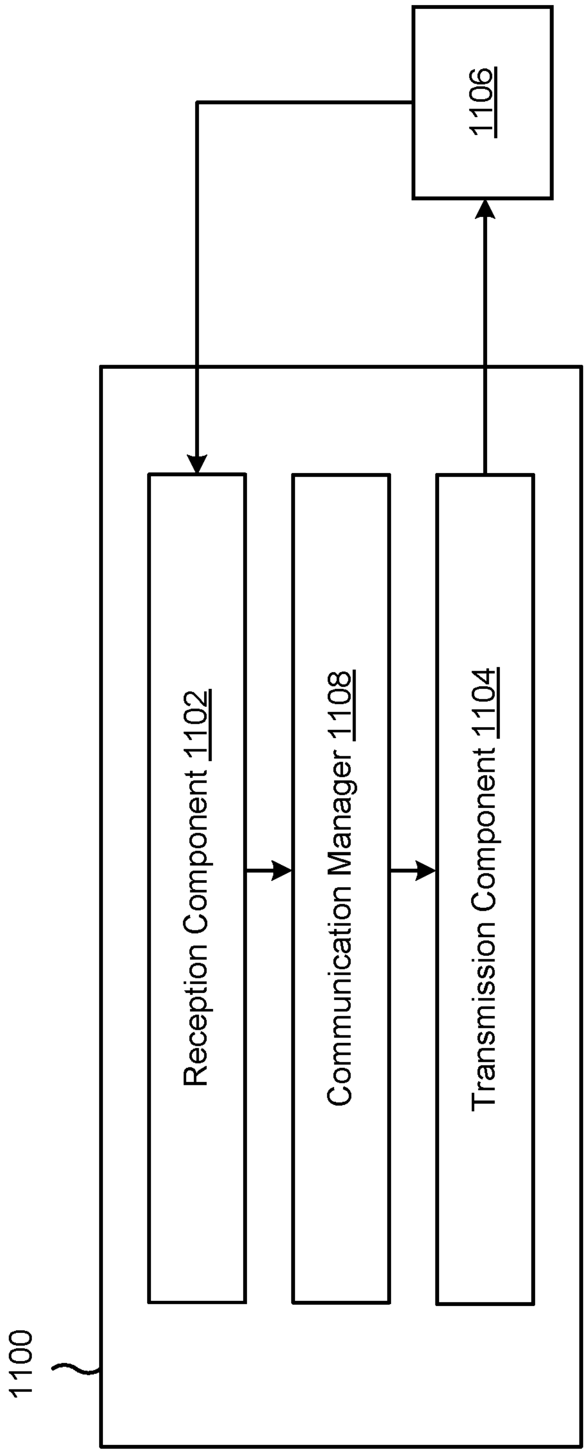

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit a configuration for transmitting a report that indicates multiple P-MPR values for a cell of a set of one or more cells indicated in the report. The reception component 1102 may receive the report that indicates the multiple P-MPR values for the cell.

The reception component 1102 may receive a request for the configuration for transmitting the report that indicates multiple P-MPR values for the cell.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a configuration for transmitting a report that indicates multiple power-management maximum power reduction (P-MPR) values for a cell of a set of one or more cells indicated in the report; and transmitting the report that indicates the multiple P-MPR values for the cell.

Aspect 2: The method of Aspect 1, wherein a quantity of the multiple P-MPR values for the cell is based at least in part on one or more of: a configuration indicated by a base station associated with at least one of the one or more cells indicated in the report, or a communication protocol associated with the report.

Aspect 3: The method of any of Aspects 1 or 2, wherein the report indicates, for each of the multiple P-MPR values, one or more resource indexes.

Aspect 4: The method of Aspect 3, wherein the one or more resource indexes are selected from a set of candidate resource indexes associated with a resource pool.

Aspect 5: The method of any of Aspects 3 or 4, wherein a quantity of the one or more resource indexes is based at least in part on one or more of: a configuration indicated by a base station associated with at least one of the one or more cells indicated in the report, or a communication protocol associated with the report.

Aspect 6: The method of any of Aspects 1-5, wherein the report indicates, for each of the multiple P-MPR values or for each resource index associated with each of the multiple P-MPR values, a power headroom value.

Aspect 7: The method of any of Aspects 1-6, wherein the report indicates, for each of the multiple P-MPR values or for each resource index associated with each of the multiple P-MPR values, a reference signal received power value.

Aspect 8: The method of any of Aspects 1-7, wherein the report includes one or more of: an indication of whether the report includes an additional P-MPR value for the cell, an indication of whether the report includes a resource index associated with the additional P-MPR value for the cell, or an indication of whether the report includes a power headroom value associated with the additional P-MPR value for the cell.

Aspect 9: The method of any of Aspects 1-8, wherein the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

Aspect 10: The method of any of Aspects 1-9, wherein the multiple P-MPR values include an indication of a first P-MPR value and an indication of a second P-MPR value, and the first P-MPR value, or a first associated power headroom value, is indicated using a same quantization table as the second P-MPR value, or a second associated power headroom value, or the first P-MPR value, or the first associated power headroom value, is indicated using a first quantization table and the second P-MPR value, or the second associated power headroom value, is indicated using a second quantization table that is different from the first quantization table.

Aspect 11: The method of Aspect 10, wherein the second quantization table indicates a differential value relative to the first P-MPR value or the first associated power headroom value, or wherein the first quantization table indicates the first P-MPR value, or the first associated power headroom value, and a first portion of the second P-MPR value and the second quantization table indicates a second portion of the second P-MPR value.

Aspect 12: The method of any of Aspects 1-11, wherein the report includes multiple resource indexes that are associated with one or more of quasi-co-location (QCL) information or a transmission configuration state.

Aspect 13: The method of any of Aspects 1-12, wherein the configuration indicates to transmit the report that indicates the multiple P-MPR values based at least in part on indications of one or more of QCL information or a transmission configuration state identification associated with the multiple P-MPR values.

Aspect 14: The method of any of Aspects 1-13, further comprising: transmitting a request for the configuration for transmitting the report that indicates multiple P-MPR values for the cell.

Aspect 15: The method of Aspect 14, wherein transmitting the request for the configuration for transmitting the report that indicates multiple P-MPR values for the cell is based at least in part on: an amount of change in one or more P-MPR values, of the multiple P-MPR values, that satisfies a threshold.

Aspect 16: A method of wireless communication performed by a base station, comprising: transmitting a configuration for transmitting a report that indicates multiple power-management maximum power reduction (P-MPR) values for a cell of a set of one or more cells indicated in the report; and receiving the report that indicates the multiple P-MPR values for the cell.

Aspect 17: The method of Aspect 16, wherein a quantity of the multiple P-MPR values for the cell is based at least in part on one or more of: a configuration indicated by the base station, or a communication protocol associated with the report.

Aspect 18: The method of any of Aspects 16 or 17, wherein the report indicates, for each of the multiple P-MPR values, one or more resource indexes.

Aspect 19: The method of Aspect 18, wherein the one or more resource indexes are selected from a set of candidate resource indexes associated with a resource pool.

Aspect 20: The method of any of Aspects 18 or 19, wherein a quantity of the one or more resource indexes is based at least in part on one or more of: a configuration indicated by the base station, or a communication protocol associated with the report.

Aspect 21: The method of any of Aspects 16-20, wherein the report indicates, for each of the multiple P-MPR values or for each resource index associated with each of the multiple P-MPR values, a power headroom value.

Aspect 22: The method of any of Aspects 16-21, wherein the report indicates, for each of the multiple P-MPR values or for each resource index associated with each of the multiple P-MPR values, a reference signal received power value.

Aspect 23: The method of any of Aspects 16-22, wherein the report includes one or more of: an indication of whether the report includes an additional P-MPR value for the cell, an indication of whether the report includes a resource index associated with the additional P-MPR value for the cell, or an indication of whether the report includes a power headroom value associated with the additional P-MPR value for the cell.

Aspect 24: The method of any of Aspects 16-23, wherein the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

Aspect 25: The method of any of Aspects 16-24, wherein the multiple P-MPR values include an indication of a first P-MPR value and an indication of a second P-MPR value, and the first P-MPR value, or a first associated power headroom value, is indicated using a same quantization table as the second P-MPR value, or a second associated power headroom value, or the first P-MPR value, or the first associated power headroom value, is indicated using a first quantization table and the second P-MPR value, or the second associated power headroom value, is indicated using a second quantization table that is different from the first quantization table.

Aspect 26: The method of Aspect 25, wherein the second quantization table indicates a differential value relative to the first P-MPR value or the first associated power headroom value, or wherein the first quantization table indicates the first P-MPR value, or the first associated power headroom value, and a first portion of the second P-MPR value and the second quantization table indicates a second portion of the second P-MPR value.

Aspect 27: The method of any of Aspects 16-26, wherein the report includes multiple resource indexes that are associated with one or more of quasi-co-location (QCL) information or a transmission configuration state.

Aspect 28: The method of any of Aspects 16-27, wherein the configuration indicates to transmit the report that indicates the multiple P-MPR values based at least in part on indications of one or more of QCL information or a transmission configuration state identification associated with the multiple P-MPR values.

Aspect 29: The method of any of Aspects 16-28, further comprising: receiving a request for the configuration for transmitting the report that indicates multiple P-MPR values for the cell.

Aspect 30: The method of Aspect 29, wherein transmitting the request for the configuration for transmitting the report that indicates multiple P-MPR values for the cell is based at least in part on: an amount of change in one or more P-MPR values, of the multiple P-MPR values, that satisfies a threshold.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more antennas; and one or more processors coupled to one or more memories, the one or more processors individually or collectively configured to cause the UE to:

receive a configuration for a report that indicates multiple power-management maximum power reduction (P-MPR) values for a cell of a set of one or more cells indicated in the report, wherein the report includes:

an indication of whether the report includes an additional P-MPR value for the cell, and an indication of whether the report includes a resource index associated with the additional P-MPR value; and transmit the report that indicates the multiple P-MPR values.

2. The UE of claim 1, wherein a quantity of the multiple P-MPR values is based at least in part on one or more of:

a configuration indicated by a network entity associated with at least one of the one or more cells indicated in the report, or a communication protocol associated with the report.

3. The UE of claim 1, wherein the report indicates, for each of the multiple P-MPR values, one or more resource indexes.

4. The UE of claim 3, wherein the one or more resource indexes are selected from a set of candidate resource indexes associated with a resource pool.

5. The UE of claim 3, wherein a quantity of the one or more resource indexes is based at least in part on one or more of:

a configuration indicated by a network entity associated with at least one of the one or more cells indicated in the report, or a communication protocol associated with the report.

6. The UE of claim 1, wherein the report indicates, for each of the multiple P-MPR values or for each resource index associated with each of the multiple P-MPR values, a power headroom value.

7. The UE of claim 1, wherein the report indicates, for each of the multiple P-MPR values or for each resource index associated with each of the multiple P-MPR values, a reference signal received power value.

8. The UE of claim 1, wherein the report includes:

an indication of whether the report includes a power headroom value associated with the additional P-MPR value.

9. The UE of claim 1, wherein the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

10. The UE of claim 1, wherein the multiple P-MPR values include an indication of a first P-MPR value and an indication of a second P-MPR value, and the first P-MPR value, or a first associated power headroom value, is indicated using a same quantization table as the second P-MPR value, or a second associated power headroom value, or the first P-MPR value, or the first associated power headroom value, is indicated using a first quantization table and the second P-MPR value, or the second associated power headroom value, is indicated using a second quantization table that is different from the first quantization table.

11. The UE of claim 10, wherein the second quantization table indicates a differential value relative to the first P-MPR value or the first associated power headroom value, or wherein the first quantization table indicates the first P-MPR value, or the first associated power headroom value, and a first portion of the second P-MPR value and the second quantization table indicates a second portion of the second P-MPR value.

12. The UE of claim 1, wherein the report includes multiple resource indexes that are associated with one or more of quasi-co-location (QCL) information or a transmission configuration state.

13. The UE of claim 1, wherein the configuration indicates to transmit the report that indicates the multiple P-MPR values based at least in part on indications of one or more of QCL information or a transmission configuration state identification associated with the multiple P-MPR values.

14. The UE of claim 1, wherein the one or more processors are further configured to cause the UE to:

transmit a request for the configuration.

15. The UE of claim 14, wherein the one or more processors, to transmit the request for the configuration, are configured to cause the UE to:

transmit the request for the configuration based at least in part on an amount of change in one or more P-MPR values, of the multiple P-MPR values, that satisfies a threshold.

16. A network entity for wireless communication, comprising:

one or more antennas; and one or more processors coupled to one or more memories, the one or more processors individually or collectively configured to cause the network entity to:

transmit a configuration for a report that indicates multiple power-management maximum power reduction (P-MPR) values for a cell of a set of one or more cells indicated in the report, wherein the report includes:

an indication of whether the report includes an additional P-MPR value for the cell, and an indication of whether the report includes a resource index associated with the additional P-MPR value; and receive the report that indicates the multiple P-MPR values.

17. The network entity of claim 16, wherein a quantity of the multiple P-MPR values is based at least in part on one or more of:

a configuration indicated by the network entity, or a communication protocol associated with the report.

18. The network entity of claim 16, wherein the report indicates, for each of the multiple P-MPR values, one or more resource indexes.

19. The network entity of claim 16, wherein the report indicates, for each of the multiple P-MPR values or for each resource index associated with each of the multiple P-MPR values, a power headroom value.

20. The network entity of claim 16, wherein the report indicates, for each of the multiple P-MPR values or for each resource index associated with each of the multiple P-MPR values, a reference signal received power value.

21. The network entity of claim 16, wherein the report includes:

an indication of whether the report includes a power headroom value associated with the additional P-MPR value.

22. The network entity of claim 16, wherein the multiple P-MPR values include an indication of a first P-MPR value and an indication of a second P-MPR value, and wherein a format for the indication of the second P-MPR value is based at least in part on the first P-MPR value, or the report includes the indication of the second P-MPR value based at least in part on the first P-MPR value.

23. The network entity of claim 16, wherein the multiple P-MPR values include an indication of a first P-MPR value and an indication of a second P-MPR value, and the first P-MPR value, or a first associated power headroom value, is indicated using a same quantization table as the second P-MPR value, or a second associated power headroom value, or the first P-MPR value, or the first associated power headroom value, is indicated using a first quantization table and the second P-MPR value, or the second associated power headroom value, is indicated using a second quantization table that is different from the first quantization table.

24. The network entity of claim 16, wherein the report includes multiple resource indexes that are associated with one or more of quasi-co-location (QCL) information or a transmission configuration state.

25. The network entity of claim 16, wherein the configuration indicates to transmit the report that indicates the multiple P-MPR values based at least in part on indications of one or more of QCL information or a transmission configuration state identification associated with the multiple P-MPR values.

26. The network entity of claim 16, wherein the one or more processors are further configured to cause the network entity to:

receive a request for the configuration.

27. A method of wireless communication performed by a user equipment (UE), comprising:

receiving a configuration for a report that indicates multiple power-management maximum power reduction (P-MPR) values for a cell of a set of one or more cells indicated in the report, wherein the report includes:

an indication of whether the report includes an additional P-MPR value for the cell, and an indication of whether the report includes a resource index associated with the additional P-MPR value; and transmitting the report that indicates the multiple P-MPR values.

28. The method of claim 27, wherein the report indicates, for each of the multiple P-MPR values, one or more resource indexes.

29. A method of wireless communication performed by a network entity, comprising:

transmitting a configuration for a report that indicates multiple power-management maximum power reduction (P-MPR) values for a cell of a set of one or more cells indicated in the report, wherein the report includes:

an indication of whether the report includes an additional P-MPR value for the cell, and an indication of whether the report includes a resource index associated with the additional P-MPR value; and receiving the report that indicates the multiple P-MPR values.

30. The method of claim 29, wherein the report indicates, for each of the multiple P-MPR values, one or more resource indexes.

* * * * *